United States Patent
Braford (10) Patent No.: US 7,246,692 B2
(45) Date of Patent: Jul. 24, 2007

(54) DUAL CLUTCH MECHANISM FOR A TRANSMISSION

(75) Inventor: Thomas E. Braford, Brighton, MI (US)

(73) Assignee: BorgWarner Inc., Auburn Hills, MI (US)

( * ) Notice: Subject to any disclaimer, the term of this patent is extended or adjusted under 35 U.S.C. 154(b) by 116 days.

(21) Appl. No.: 10/973,823

(22) Filed: Oct. 26, 2004

(65) Prior Publication Data

US 2006/0086586 A1 Apr. 27, 2006

(51) Int. Cl.
- F16D 25/0638 (2006.01)
- F16D 25/10 (2006.01)

(52) U.S. Cl. .............. 192/87.11; 192/48.8; 192/85 AA; 192/106 F (58) Field of Classification Search ............... 192/48.8, 192/87.11
See application file for complete search history.

(56) References Cited

U.S. PATENT DOCUMENTS

| | | | |
|---|---|---|---|
| 4,741,422 A | | 5/1988 | Fuehrer et al. |
| 4,964,504 A | * | 10/1990 | Friedmann ................. 192/48.4 |
| 5,887,690 A | | 3/1999 | Haupt |
| 6,382,382 B1 | | 5/2002 | Avny et al. |
| 6,401,894 B1 | * | 6/2002 | Merkel et al. ............. 192/48.9 |
| 6,491,149 B1 | | 12/2002 | Kundermann et al. |
| 6,523,657 B1 | | 2/2003 | Kundermann et al. |
| 6,634,477 B2 | * | 10/2003 | Beneton et al. ............ 192/48.8 |
| 6,929,107 B2 | * | 8/2005 | Hegerath ................. 192/87.11 |
| 2001/0035328 A1 | | 11/2001 | Tanikawa |
| 2003/0116396 A1 | | 6/2003 | Kuhstrebe |
| 2004/0206599 A1 | | 10/2004 | Hegerath |
| 2005/0082136 A1 | * | 4/2005 | Braford et al. .......... 192/48.91 |
| 2005/0189195 A1 | * | 9/2005 | Heinrich et al. ......... 192/87.11 |

FOREIGN PATENT DOCUMENTS

| | | |
|---|---|---|
| DE | 101 15 454 A1 | 8/2002 |
| DE | 101 15 453 A1 | 10/2002 |
| DE | 102 03 618 A1 | 2/2003 |
| EP | 0 321 873 B1 | 6/1989 |
| EP | 1 195 537 A1 | 4/2002 |
| EP | 1 378 679 A2 | 1/2004 |
| EP | 1521003 A1 * | 4/2005 |

\* cited by examiner

Primary Examiner—Richard M. Lorence
(74) Attorney, Agent, or Firm—Fitch, Even, Tabin & Flannery; Greg Dziegielewski (57) ABSTRACT

A dual clutch mechanism includes an input shaft, a first output shaft and a second output shaft. The input shaft is axially spaced from the first and second output shafts, which can allow for a decreased diameter of the dual clutch mechanism. Axially spacing the input shaft from the first and second output shafts also can allow for an increased diameter of the first and second output shafts without necessitating a corresponding increase in the diameter of the dual clutch mechanism.

25 Claims, 2 Drawing Sheets

DUAL CLUTCH MECHANISM FOR A TRANSMISSION

FIELD

The invention relates generally to a clutch mechanism for a transmission, and in particular to a dual clutch mechanism for a transmission.

BACKGROUND

Dual clutch mechanisms typically have a single input shaft that, through a pair of selectively engageable plate clutch mechanisms, drives one of a pair of output shafts for rotation. In some such arrangements, each of the input and output shafts are concentrically arranged with respect to each other. One example of such an arrangement uses an input shaft positioned within a hollow inner output shaft, which in turn is positioned within a hollow outer output shaft.

Such dual clutch mechanisms typically have a first clutch arrangement which has a driven side and a driving side, along with a second clutch arrangement which also has driven side and a driving side. The selective activation of either of the first and second clutch arrangements allows for the input shaft to drive one of the inner and outer output shafts. The driven sides of the first and second clutch arrangements is driven for rotation via the input shaft, which is disposed within both the inner and outer output shafts. The driving side of the first clutch arrangement selectively drives one of the inner and outer output shafts for rotation, while the driving side of the second clutch arrangement selective drives the other of the inner and outer output shafts for rotation.

Dual clutch mechanisms can be used in automotive transmission systems, such as for use with shifting between gears in an automatic transmission. A consideration in configuring a dual clutch mechanism for a particular automobile can be the size of the mechanism, and in particular the overall radial extent of the mechanism.

Having concentric input, inner output and outer output shafts restricts the minimum radial extent available for a given dual clutch mechanism. The minimum radial spacing taken upon the three concentric shafts is further limited by operational requirements for each of the shafts. The desired properties of the three shafts also are restricted by the minimum overall radial space available for the dual clutch mechanism. Morever, the longer the axial lengths of the shafts, generally the less torsionally stiff the shafts, which represents a further limitation in the design of dual clutch mechanisms.

A clutch support is often provided concentric with the input and output shafts for transmitting rotation from the input shaft to the driven sides of both of the first and second clutch mechanisms. The clutch support partially surrounds the outer output shaft, which in turn surrounds the inner output shaft, and which itself surrounds the input shaft. Sealing rings are positioned between the clutch support and the adjacent shaft or an intermediate fluid distribution sleeve.

The clutch support is often connected to the input shaft by a clutch housing, which can extend from one side of the clutch mechanism, adjacent the input shaft, to the other side of the clutch mechanism, adjacent the output shafts. In such a clutch mechanism, the driving force is transmitted from the input shaft to the housing, which wraps around the first and second clutch arrangements from one side to the other, to the clutch support and then finally to the driven sides of the first and second clutch mechanisms. Such a driving path can result in undesirably high stresses in the transmission housing. The high stresses in the transmission housing can be exacerbated as the radial extent of the dual clutch mechanism is increased.

In addition, having a concentric clutch support, outer output shaft, inner output shaft and input shaft requires a minimum radius, depending upon the sizes of the support and shafts due to the diameters of each. This minimum radius is a limitation on the overall radial extent of the dual clutch mechanism. This minimum radius is also a limitation on the minimum diameter of sealing rings necessary to seal between the clutch support and the adjacent inner output shaft or an intermediate fluid distribution sleeve.

Dual clutch mechanisms often have radially extending pistons for selectively activating the first and second clutch mechanisms. The first and second clutch arrangements can be radially spaced from the input and output shafts. In such cases, the pistons extend radially from proximate the clutch support to clutch plates of each of the first and second clutch mechanisms. The larger the radial extent of the dual clutch mechanism, the greater the force that can be required to engage the piston with its respective plate clutch arrangement.

Dual clutch mechanisms can have the first and second clutch arrangements positioned parallel to each other along the principle axis of rotation of the clutch mechanism. An example of a parallel dual clutch mechanism is disclosed in EP1195537. As shown in the '537 publication, however, the input shaft is concentrically disposed relative to both a hollow inner and a hollow outer output shaft.

Dual clutch arrangements also can have the first and second clutch mechanisms positioned radially with respect to each other. An example of a radial dual clutch mechanism is disclosed in U.S. Pat. No. 6,491,149. As shown in the '149 patent, however, the input shaft is concentrically disposed relative to both a hollow inner and a hollow outer output shaft.

SUMMARY

In one aspect, a dual clutch mechanism includes an input shaft, and a first and second concentrically disposed output shafts. The input shaft is axially spaced from the first and second output shafts reducing the overall diameter of the dual clutch mechanism without a significant (if any) loss in the clutch's operating efficiency. Thus, the reduced, combined radial space required for the input and concentric first output and second output shafts permits the use of the dual clutch in applications where other dual clutch systems could not be used, or have been used by compromising the design of other aspects of the overall drive system.

In another aspect, axially spacing the input shaft from the first and second output shafts allows for an increased diameter of the first and second output shafts without necessitating a corresponding significant (if any) increase in the radial dimensions of the dual clutch mechanism. The increased diameter of the two concentric output shafts results in an increase in the torsional stiffness of the shafts, and, in some applications, also permits a reduction in the length of the shafts. Thus, this aspect provides improvements in the operating characteristics of the powertrain system and further space savings. In another aspect, this diameter of the input shaft also may be increased, and, in some applications, the input shaft length reduced to further minimizing the total space required for the dual clutch mechanism.

In another aspect, spacing the input shaft from the output shafts axially allows a reduction in the diameter and size of the clutch hub or clutch. Such a reduction provides additional space savings and, in some instances reduces the size and cost of sealing rings necessary to seal between the clutch hub and the outer output shaft or an intermediate fluid distribution sleeve.

The reduction in the overall radial dimensions of the clutch also allows for a decrease in the diameter of the clutch apply pistons operating the clutch friction disk systems while maintaining a comparable operating efficiency. A reduction in the radial dimension of the clutch further can reduce the effects of centrifugal forces on the clutch apply pistons and the required force necessary to apply engage the first and second clutch mechanisms.

In another aspect, the dual clutch mechanism for an automotive transmission has an input shaft and a pair of output shafts. The pair of output shafts include a hollow outer output shaft surrounding an inner output shaft. The hollow outer output shaft and the inner output shaft are each associated with a separate clutch arrangement. The clutch arrangements are both driven by an input shaft. The clutch arrangements are selectively actuable to allow the driving side of each of the clutch plates to be driven by the inner output shaft. The input shaft, although having a common axis with the inner and outer output shafts, is spaced a lateral distance apart from the output shafts. By having the input shaft axially spaced from the inner and outer output shafts, the overall diameter of the first and second clutch arrangements can be decreased while the diameter of the inner and outer output shafts can be increased. This dual clutch mechanism can be used for both a parallel dual clutch mechanism and a radial dual clutch mechanism.

In another aspect, the dual clutch mechanism for an automotive transmission includes an input shaft adaptive for rotation about a longitudinally extending axis. A first clutch arrangement is coaxial with the axis of the input shaft. The first clutch arrangement has a first clutch driven plate and a first clutch driving plate. A second clutch arrangement is also coaxial with the axis of the input shaft and spaced from the first clutch arrangement. The second clutch arrangement also has a second clutch driven plate and a second clutch driving plate. In this aspect, a clutch hub or support, which is coaxial with the axis of the input shaft and at least partially surrounding a portion of the input shaft, is operably connected to the first and second driven plates to drive the driven plates for rotation. The clutch hub is also connected to the input shaft such that the input shaft drives the clutch hub for rotation. Thus, the first and second clutch driven plates are rotated via the clutch hub by the input shaft.

A pair of output shafts are connected to the driving plates of the first and second clutch arrangements. The inner and outer output shafts may comprise a hollow outer output shaft having an inner output shaft disposed within. The hollow outer output shaft is operably connected to the first clutch driving plate for rotation therewith. The hollow outer output shaft is coaxial with the axis of the input shaft but spaced an axial distance from the input shaft. The inner output shaft is positioned within the outer output shaft and is adapted for rotation independent thereof. The inner output shaft is operably connected to the second clutch driving plate for rotation therewith, and the inner output shaft is also coaxial with the axis of the input shaft but spaced an axial distance therefrom.

It should be understood that the above figures are not necessarily to scale. In certain instances, details of the actual structure shown in the Figures which are not necessary for the understanding of the present invention have been omitted. It should also be understood that the Figures are provided to illustrate an example of the invention and that the invention is not necessarily limited to the particular example and aspects discussed herein.

DETAILED DESCRIPTION OF THE DRAWINGS

Figure 1:
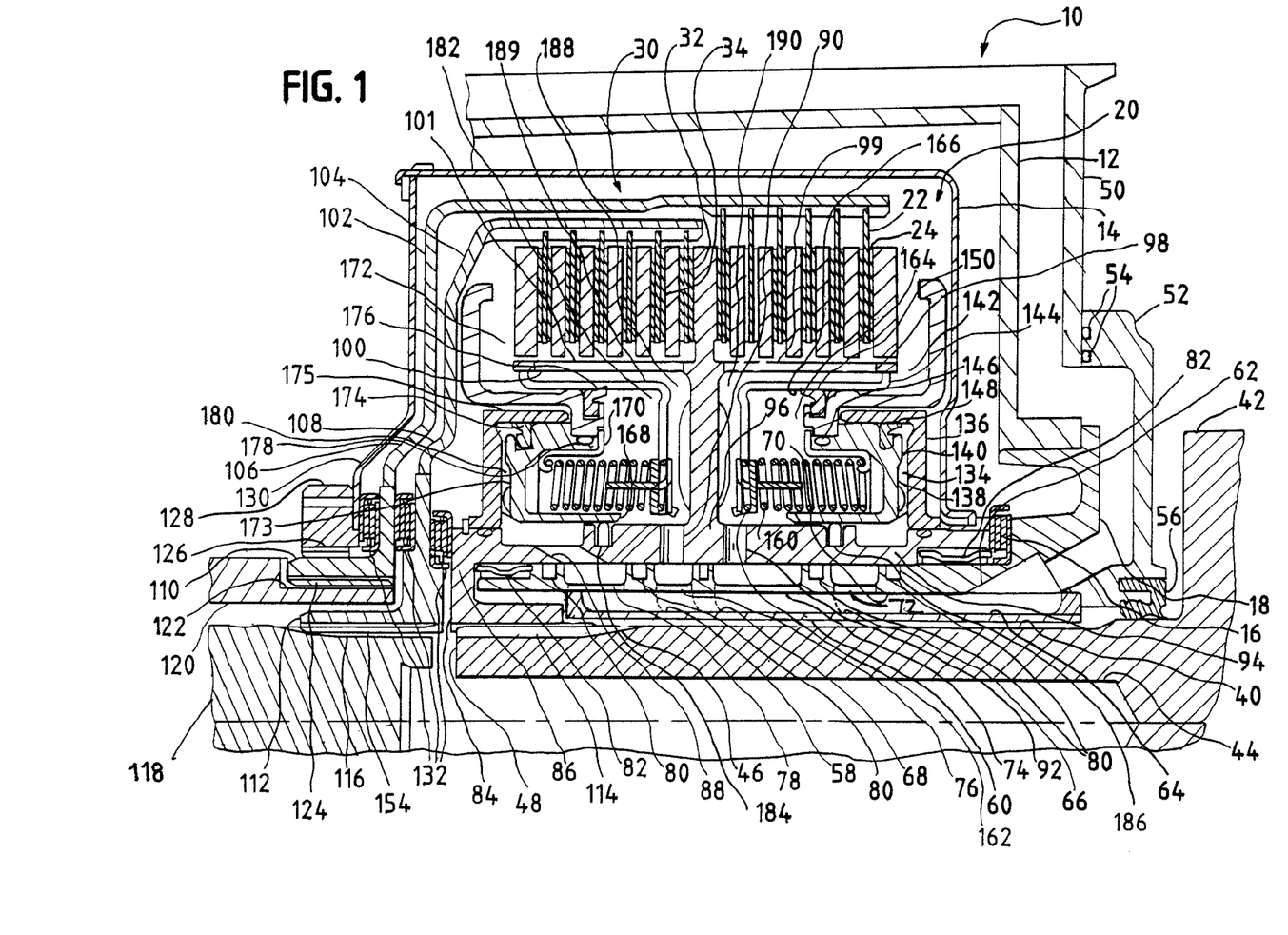
FIG. 1 is a sectional view of a parallel clutch arrangement having a non-non-concentric input shaft relative to the output shafts.
Figure 2:
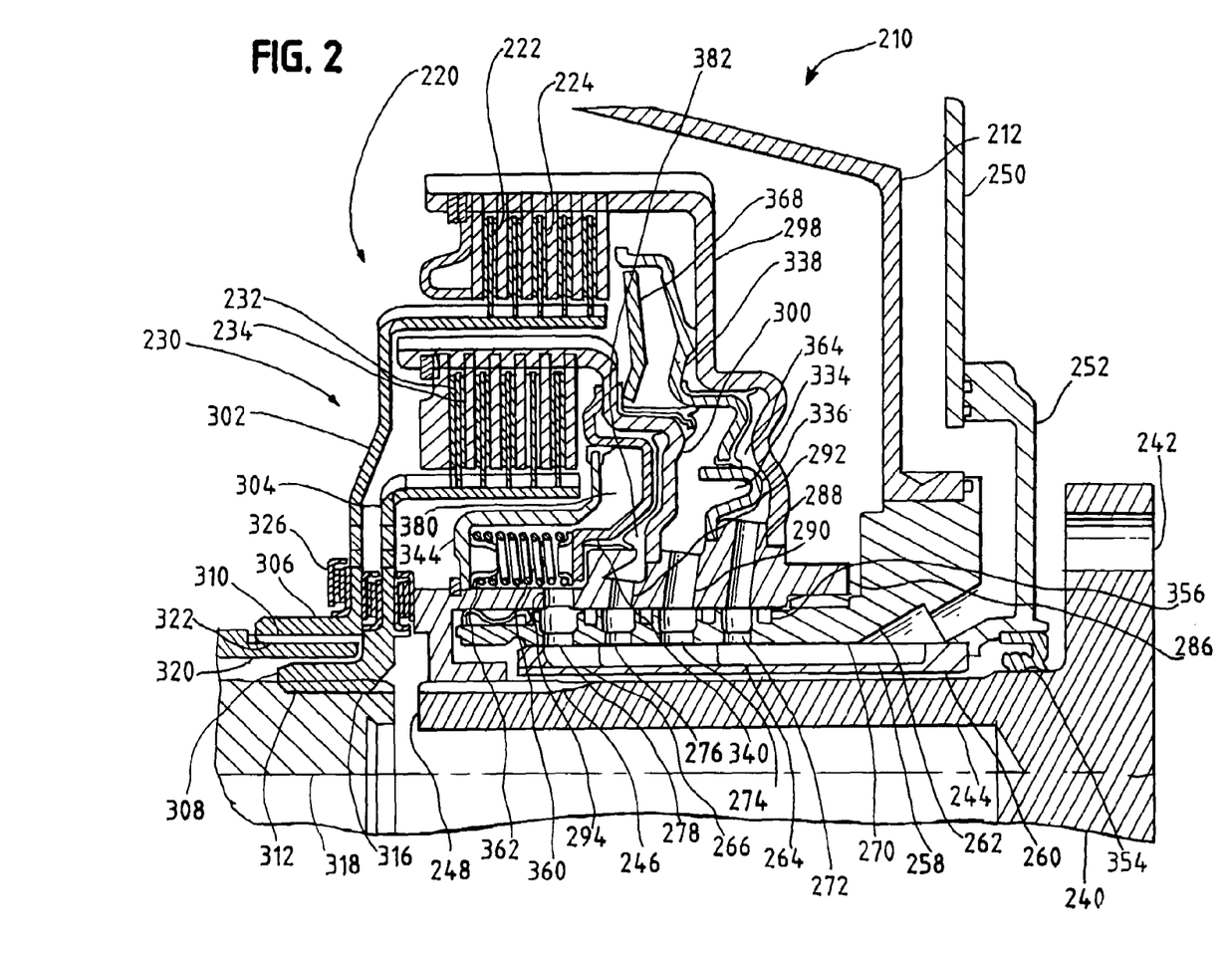
FIG. 2 is a sectional view of a radial dual clutch arrangement having a non-concentric input shaft relative to the output shafts.

A dual clutch mechanism 10, such as illustrated in FIGS. 1 and 2, typically includes an input shaft 40, a first output shaft 120 and a second output shaft 118. In this example, the input shaft is axially spaced from the first and second output shafts 120 and 118. Spacing the input shaft axially from the first and second output shafts 120 and 118 allows for both a decreased diameter of the dual clutch mechanism 10, for an increased diameter of the input 40, first and second output shafts 120 and 118 without necessitating a corresponding increase in the overall diameter of the dual clutch mechanism 10, for use of decreased length shafts 40, 120 and 118, for the use of smaller diameter sealing rings, and for the use of pistons having decreased diameters.

In this example, the dual clutch mechanism 10 includes a first clutch arrangement 20 and a second clutch arrangement 30. The first and second clutches 20 and 30 may be aligned in a parallel relationship, as illustrated in FIG. 1 and discussed below. Alternatively, a first and second clutch arrangements 220 and 230 may be arranged in a radial relationship, as illustrated in FIG. 2 and further discussed below.

In the parallel dual clutch arrangement 10, as illustrated in FIG. 1, the first and second clutch mechanisms each have a driven side and a driving side. The driven side of each of the first and second clutch arrangements 20 and 30 is operably connected to the input shaft 40. The driving side of the each of the first and second clutch arrangements 20 and 30 is operably connected to the output shafts 120 and 118. The first clutch arrangement 20 is connected to the outer output shaft 120 and the second clutch arrangement 30 is connected to the inner output shaft 118. The inner and outer output shafts 118 and 120 are concentric. However, the inner and outer output shafts 118 and 120 are not concentric with the input shaft 40, but rather are spaced an axial distance apart.

In this example of the invention, the inner and outer output shafts 118 and 120, share a common axis of rotation with the input shaft 40. By arranging the input shaft 40 in a nonconcentric relation the output shafts 118 and 120, the overall diameter of the clutch mechanism 10 can be reduced without loss in the efficiency of the clutch. In one example, the diameter of the clutch can be reduced as much as about 10% or more when compared to a comparable clutch with concentric input and output shafts.

The diameters of the inner and outer output shafts 118 and 120 also can be increased and the lengths decreased to increase their stiffness without requiring significant increases in the overall diameter of the clutch mechanism 10. In one example of such a reduction, the length of the output shafts 118 and 120 can be reduced by about 20% and the diameter can be increased about 20%–30% relative to a comparable systems with all concentric input and output shafts. Such changes can provide benefits in that higher torque capacity can be achieved for given clutch system diameter.

Turning to the driven side of the first and second clutch arrangements 20 and 30, the input shaft 40 is adapted to be driven by a transmission of the engine. One end of the input shaft 40 has a flange 42 and the other end 48 has a spline 46. The input shaft 40 may include a bore 44. The spline 46 is positioned to drive a clutch hub 86 via a clutch hub support member 84 which also has a spline 114 for engagement with the spline 46 on the end 48 of the input shaft 40. The clutch hub 86 has a centrally disposed trunk 96 which branches into two arms 98 and 100. One of the arms 98 has a plurality of plate clutch members 24 for the first plate clutch arrangement 20 and the other of the arms 100 has a plurality of plate clutch members 34 for use with the second plate clutch mechanism 30.

Turning now to the output or driving side of the clutch device 10, the driving side of the first and second plate clutch arrangements 20 and 30 each include a plurality of driving clutch plates 22 and 32 intermeshed with the driven clutch plates 24 and 34. The first clutch driving plates 22 are operably connected to one end of an output plate 102, and the second clutch driving plates 32 are operably connected to one end of another output plate 104. At another end 106 of the first clutch output plate 102 is an output plate interface 110. Likewise, at another end 108 of the second clutch output plate 104 is another output plate interface 112. The interface 110 of the first clutch output plate 102 has a spline 124, and the interface of the 112 of the second clutch plate outlet 104 also has a spline 154. Each of the output shafts 120 and 118 has a spline 122 and 116 positioned to engage the splines 124 and 154 of the first and second clutch output plates 102 and 104 in driving arrangement. Thus, the outer output shaft 120 is connected in driving engagement with the first clutch driving plates 22 via the first clutch output plate 102, and the inner input shaft 118 is independently connected in driving engagement with the second clutch driving plates 32 via the second clutch output plate 104.

In order to engage the driving clutch plates 22 and 32 with their respective driven clutch plates 24 and 34, an associated piston 138 or 168 is used to compress the plates 22 and 24 or 32 and 34 together such that the driven plates 24 and 34 drive the driving plates 22 and 32. Each of the first and second plate clutch arrangements 20 and 30 has its associated piston 138 and 168 moveable from a first position to a second position. In the first position, the piston 138 or 168 is disengaged from the clutch 20 or 30, while in the second position the piston 138 or 168 applies pressure to the clutch plates 32 and 34 or 22 and 24 to compress the driven and driving clutches 20 or 30 of each of the clutch arrangements 20 and 30. The piston 138 or 168 is shifted from its first to second position when pressure is applied within a pressure chamber 134 or 180.

Once sufficient pressure has been applied within the pressure chamber 134 or 180 to overcome a spring biasing force, which biases the piston 138 or 168 to the first position, the piston 138 or 168 is allowed to move to the second position. Pressurized fluid is provided to the pressure chamber 134 and 180 of each of the clutch arrangements 20 and 30. Pressurized fluid is also provided in a pressure balance chamber 164 and 182 on the opposite side of each of the pistons 138 and 168. Furthermore, fluid is also supplied via a fluid passage 190 and 188 to the plate clutch arrangements 20 and 30 for cooling thereof.

Each of the pistons 138 and 168 is configured for ease of manufacture by having two separate components, a lower component 140 or 173 and an upper component 142 or 172. Each of the upper components 142 and 172 is joined to its respective lower component 140 and 173. A seal 178 is positioned at the joint to prevent leakage between the components 140 and 142 or 173 and 172.

The pressure apply chamber 134 for the first plate clutch arrangement 20 is formed between the piston 138 and a pressure chamber housing member 136. The pressure chamber housing member 136 is secured to the clutch hub 86, and a seal may be provided there between to reduce leakage of fluid from the chamber 134. A seal 148 may also be provided between the piston 138 and the pressure chamber housing member 136. A seal 186 may also be provided between the piston 138 and the clutch hub 86. Fluid enters the pressure apply chamber 134 via the fluid passage 64 in the oil distribution sleeve 60, fluid passage 72 in the clutch support 70, and fluid passage 94 in the clutch hub 86. Similarly, the pressure apply chamber 180 for the second plate clutch arrangement 30 is formed between the piston 168 and a pressure chamber housing member 175, which also is secured to the clutch hub 86. A seal 174 may also be provided between the piston 168 and the pressure chamber housing member 175. A seal 184 may also be provided between the piston 168 and the clutch hub 86. Fluid enters the pressure apply chamber 180 via the fluid passage 58 in the oil distribution sleeve 60, fluid passage 78 in the clutch support 70, and fluid passage 88 in the clutch hub 86.

In this example, pressure balance chambers are provided to offset the tendency of the fluid within the pressure chambers 134 and 180 to apply undesirable pressure on the pistons 138 and 168 due to the centrifugal forces acting on the fluids during operation of the clutch. The pressure balance chamber 164 for the first plate clutch arrangement 20 is formed between the piston 138 and a pressure chamber housing member 144. The pressure chamber housing member 144 extends from near the clutch hub 86 to the first clutch support arm 98, and includes an axially extending segment 166. Fluid enters the pressure balance chamber 164 via the fluid passage 66 in the oil distribution sleeve 60, fluid passage 74 in the clutch support 70, and fluid passage 92 in the clutch hub 86. The pressure balance chamber 182 for the second plate clutch arrangement 30 is similar to that of the pressure balance chamber 164, and is formed between the piston 168 and a balance chamber housing member 189.

The balance chamber housing member 144 for the first plate clutch arrangement 20 is spaced a distance from the support trunk 96 and a portion of the support arm 98 to define a fluid passage 190 there between. Likewise, the balance chamber housing member 189 for the second plate clutch arrangement 30 is spaced a distance from the support trunk 96 and support arm 100 to define a fluid passage 188 there between.

The reduction of the radial dimensions of the clutch of this example can result in a signification reduction in the centrifugal forces exerted on the fluids within the clutch. The dimensions of the balance chamber, accordingly, can be reduced to provide further space savings and efficiencies in the fluid flow within the clutch, as well as reducing centrifical effects acting on the applied piston.

The housing members 144 and 189 are each arranged such that fluid can flow both into the pressure balance chamber 164 or 182 and into the fluid passage 190 or 188. For example, the lower ends of the housing members 144 and 189 may be spaced from the clutch hub 86 or have an opening therein permitting fluid to flow to both the pressure balance chambers 164 and 182 and the fluid passages 190 and 188. The housing members 144 and 189 are connected to the arm 98 or 100 for support. The fluid passage 190 permits fluid, such for purposes of cooling, to be directed to the clutch plates 22 and 24 of the first clutch arrangement 20. The fluid passage 188 directs fluid to the clutch plates 32 and 34 of the second clutch arrangement 30. To this end, one or more openings 99 and 101 may be provided in the support arms 98 and 100 to allow fluid to flow between the clutch plates 22 and 24 or 32 and 34.

Within each of the pressure balance chambers 164 and 182 a spring 160 is positioned to bias the respective piston 138 and 168 away from the position where the piston 138 or 168 compresses the clutch plates 22 and 24 or 32 and 34. The springs 160 are positioned within a common carrier 162 that extends through each of the pressure balance chambers 164 for the first plate clutch arrangement 20. A common carrier 170 also extends through each of the pressure balance chamber 182 for the second plate clutch arrangement 30. The use of the common carriers 162 and 170 simplifies assembly of the dual clutch mechanism 10 by allowing the springs 160 to be placed in their respective carriers 162 and 170 and then insertion of the carriers 162 and 170 into their respective chambers 164 and 182, instead of requiring each spring 160 to be individually placed in each of the multiple chambers 164 and 182.

The fluid is supplied by a pump which drives fluid through a fluid inlet passage 62 to a fluid distribution sleeve 60. The fluid distribution sleeve 60 is coaxial with the input shaft 40, but is rotatably independent relative to the input shaft 40. The fluid distribution sleeve 60 has four distribution passageways 58, 68, 66 and 64. Each of these fluid distribution passageways 58, 68, 66 and 64 transmits fluid to corresponding fluid passageways 72, 74, 76 and 78 in a clutch support sleeve 70. The clutch support sleeve 70 is also rotationally independent relative to the inner shaft 40.

The clutch hub 86 rotates relative to the clutch support 70 and distribution sleeve 60 when driven by the input shaft 40. A plurality of bearings 82 are disposed between the clutch support 70 and the clutch hub 86 to allow for a relative rotation there between. A plurality of seals 80 are disposed between the clutch support sleeve 70 and the clutch hub 86. The seals 80 can have a reduced diameter due to the clutch support sleeve 70 and clutch hub 86 surrounding only the input shaft 40, as opposed to prior dual clutch mechanisms where the clutch support sleeve and clutch hub surrounded the input shaft, inner output shaft and outer output shaft. The reduced diameter seals 80 can be less costly, and, in one example, the seal diameter can be reduced by 10%–30% relative to systems using concentric input and output shafts.

The fluid passages 72, 74, 76 and 78 of the clutch support 70 are aligned with fluid passages 88, 90, 92 and 94 of the clutch hub. As mentioned above, there are four fluid passages in the distribution sleeve 60, clutch support 70 and clutch hub 86. Two of the oil passages are for the first clutch arrangement 20 and two are for the second clutch arrangement 30. For each clutch arrangement 20 and 30, one of the fluid passages supplies fluid to the pressure apply chamber 134 and 180, while the other supplies fluid to the pressure balance chamber 164 and 182 and the fluid passage 188 and 190 for providing cooling fluid to the plate clutch arrangements 20 and 30.

In operation, the input flange 42 is driven to rotate the connected input shaft 40. Rotation of the input shaft 40 causes rotation of the clutch hub 86 via the clutch hub support member 84, which causes the trunk 96 and arms 98 and 100 thereof to rotate, along with the driven clutch plates 24 and 34 attached thereto. Depending upon which of the first and second plate clutch arrangements 20 or 30 is engaged, due to the pressure in the pressure apply chamber 134 and 180 increasing over the pressure in the balance chamber 164 and 182 and the spring 60 bias force therein a sufficient amount to cause the piston 138 or 168 to shift and compress the driven clutch plates 22 or 32 with the driving clutch plates 24 or 34. When the plate clutches, both driven and driving, are engaged with each other via friction, the driving output plate 102 or 104 attached to the driving clutch plates 24 or 34 is driven for rotation with the input shaft 40. The driving output plates 102 or 104 then independently drive their associated inner or outer output shaft 118 or 120 for rotation. Thus, via the first and second clutch arrangements 20 and 30, the rotation of the input shaft 40 can selectively rotate one or the other of the output shafts 118 and 120.

The dual clutch mechanism 10 includes an outer housing 50, an inner housing 14, and an intermediate housing 12 disposed between the inner and outer housings 14 and 50. The outer housing 50 is disposed around the first and second clutch arrangements 20 and 30 and is independently rotatable relative to the input and output shafts 40, 118 and 120. A sealing member 56 is positioned between the input shaft 40, proximate the input flange 42, and the outer housing 50 in order to allow for relative rotation between the input shaft 40 and the outer housing 50 while minimizing the amount of fluid that can pass between the sealing member 56 and the input shaft 40. The outer housing 50 may include a portion 52 with seals 54 opposite the sealing member 56.

The inner housing 14 is operably connected to and driven for rotation by the input shaft 40. More particularly, the inner housing 14 is connected at one end to the clutch support 86, which in driven by the input shaft 40. The other end 130 of the inner housing 14 is connected to a pump gear 128 for driving a pump shaft configured for supplying fluid to the dual clutch mechanism 10. A bearing 126 is positioned between the pump gear 128 and the outer output shaft 118 (or drive member thereof 110) to permit relative rotation there between.

The intermediate housing 12 is rotatably independent relative to the input and output shafts 40, 118 and 120. The intermediate housing 12 may include a portion 18 that defines a section of a fluid supply path for supplying fluid to each of the first and second clutch arrangements 20 and 30 via the passage 62 and the fluid distribution sleeve 60, clutch hub 86, and clutch support 70.

A plurality of bearings 132 are disposed between the inner clutch housing 14 and the first clutch output plate 102, between the first and second plate clutch output plates 102 and 104, and between the second clutch output plate 104 and the clutch hub 86 to allow for relative rotation between each. A bearing 16 is disposed between a portion 18 of the intermediate housing 12 and the clutch hub 86.

Non-concentric, spaced input and output shafts can also be used in a radial dual clutch mechanism 210, as illustrated in FIG. 2. Instead of having the first and second clutch arrangements spaced lengthwise along the input shaft, as illustrated in the parallel dual clutch mechanism of FIG. 1, the radial dual clutch mechanism has one of the first and second clutch arrangements 220 and 230 positioned between the other of the first and second clutch arrangements 220 and 230 and the input shaft 240.

The radial dual clutch mechanism 210 includes an input shaft 240 which is operably connected to drive a driven side of first and second plate clutch arrangements 220 and 230. An outer output shaft 320 is operably connected to a driving side of the first plate clutch arrangement 220, and an inner output shaft 318 is operably connected to a driving side of the second plate clutch arrangement 230. The first plate clutch arrangement 220 is selectively operable to allow its driven side to drive its driving side, thereby driving the outer output shaft 320. The second plate clutch arrangement 230 is also selectively operable to allow its driven side to drive its driving side, thereby driving the inner output shaft 318.

The inner end 248 of the input shaft 240 is spaced a distance from the inner and outer output shafts 318 and 320, as illustrated in FIG. 2. The advantages of spacing the input shaft 240 from the output shafts 318 and 320 allows for the advantages discussed above with respect to the parallel dual mechanism 10. For example, having the input shaft non-concentric with the output shafts allows for reduction in the overall diameter of the clutch mechanism 210, use of increased diameter (and increased stiffness) shafts, and reduced diameter sealing rings.

The first and second plate clutch arrangements 220 and 230 are each formed of a plurality of intermeshing clutch plates. The first plate clutch arrangement 220 has a set of clutch plates 224 attached to a driven plate 298, while an intermeshing set of clutch plates 222 are attached to a driving plate 302. A piston 338 is selectively shifted from an unengaged position to an engaged position whereby the piston compresses the clutch plates 222 and 224 together to permit the driven plate 298 to drive the driving plate 302. Likewise, the second plate clutch arrangement 230 has a set of clutch plates 234 attached to a driven plate 300, while an intermeshing set of clutch plates 232 are attached to a driving plate 304. A piston 340 is selectively shifted from an unengaged position to an engaged position whereby the piston compresses the clutch plates 232 and 234 together to permit the driven plate 300 to drive the driving plate 304.

The piston 338 of the first plate clutch arrangement 220 separates a pressure apply chamber 364 from a pressure balance or compensation chamber 334. A plate spring 368 is positioned in the pressure balance chamber 334 and biases the piston 338 from its engaged position, whereby the intermeshing clutch plates 222 and 224 are pressed into engagement with each other, to its unengaged position. Similarly, the piston 340 of the second plate clutch arrangement 230 separates a pressure apply chamber 382 from a pressure compensation chamber 380. Positioned within the pressure compensation chamber 380 is a plurality of coil springs 360 each placed in a spring carrier 362. The coil springs 360 bias the piston 340 from its engaged position, whereby the intermeshing clutch plates 232 and 234 are pressed into engagement with each other, to its unengaged position.

The piston 338 of the first plate clutch arrangement 220 is shifted from its unengaged position to its engaged position when the pressure in the apply chamber 364 is greater than the pressure in the balance chamber 336 and the biasing force of the spring 368. The piston 340 of the second plate clutch arrangement 230 is shifted from its unengaged position to its engaged position when the pressure in the apply chamber 382 is greater than the pressure in the balance chamber 380 and the biasing force of the springs 360.

Fluid is supplied to the first and second plate clutch arrangements 220 and 230 via a network of fluid passages. Fluid flows between inner and outer clutch housings 212 and 250 and enters a passage 262 which leads to a fluid distribution sleeve 260. The fluid distribution sleeve 260 is concentrically disposed around the input shaft 240, and has a plurality of grooves 258, 264, and 266 formed therein. The grooves 258, 264 and 266 of the fluid distribution sleeve 260 are each aligned with a fluid passage 272, 274, 276 or 278 formed in a clutch support 270 which is concentrically disposed around the fluid distribution sleeve 260. The fluid passages 272, 274,276 and 278 of the clutch support 270 are aligned with fluid passages 288, 290, 292 and 294 of a clutch hub 286, concentrically disposed around the clutch support 270. The fluid passages of the fluid distribution sleeve 260, clutch support 270, and clutch hub 286 are aligned to define separate fluid paths to the pressure apply chamber 364 and pressure balance chamber 334 of the first clutch arrangement 220 and to the pressure apply chamber 382 and pressure balance chamber 380 of the second clutch arrangement 230. A plurality of seals 356 are positioned between the clutch hub 286 and the clutch support sleeve 270 to provide sealing therebetween while permitting relative rotation.

The clutch hub 286 is adapted for rotation with the input shaft 240 via a spline 246 on the end 248 of the input shaft 240. Attached to the clutch hub 286 and adapted for rotation therewith are the clutch driven plates 298 and 300. The inner housing 212 is attached to an extension of the clutch hub 286 proximate the fluid passage 262. The outer clutch housing 250 does not rotate with the clutch hub 286, but instead has a bracket extension 252 at one end which rests on a seal 354 between the extension 252 and the input shaft 240 to allow for rotation therebetween while minimizing fluid loss.

In addition, attached to the clutch hub 286 is a first clutch arrangement chamber divider 336. The divider 336 separates the apply and balance chambers 364 and 336 until the piston 338 separates the chambers 364 and 336. The divider 336 has a surface upon which an end of the piston slides. A second clutch arrangement divider 344 is attached to the clutch hub 286, and, in conjunction with the piston 340, define portions of the limits of the pressure balance chamber 380.

On the driving side of the dual clutch mechanism 210, the driving plate 302 of the first clutch arrangement 220 has a connection bracket 306 at its end, and the driving plate 304 of the second clutch arrangement 230 also has a connection bracket 308 at its end. The connection brackets 306 and 308 each have a spline surface 310 and 312, which are adapted to mesh in driving engagement with corresponding spline surfaces 322 and 318 on the outer and inner output shafts 320 and 318, respectively. A plurality of roller bearings 326 are placed between the driving plates 302 and 304.

In operation, the input shaft 240 is driven for rotation by its input gear 242. Rotation of the input shaft 240 causes the clutch hub 286 to rotate. Rotation of the clutch hub 286 also drives the driven plate 298 of the first clutch arrangement 220 for rotation, along with the driven plate 300 of the second clutch arrangement 230. To activate the outer output shaft 320, fluid is supplied to the pressure apply chamber 364 of the first clutch arrangement 220 to shift the piston 338 to its engaged position compressing the intermeshing clutch plates 222 and 224. When the clutch plates 222 and 224 are compressed, the driving plate 302 drives the outer output shaft 320 for rotation. To activate the inner output shaft 318, fluid is supplied to the pressure apply chamber 364 of the first clutch arrangement 220 to shift the piston 338 to its engaged position compressing the intermeshing clutch plates 222 and 224. When the clutch plates 222 and 224 are compressed, the driving plate 302 drives the outer output shaft 320 for rotation.

While the invention has been described by reference to certain specific descriptive examples which illustrate preferred materials and conditions, it is understood that the invention is not limited thereto. Rather all alternatives, modifications and equivalents within the scope of the invention so described are considered to be within the scope of the appended claims.

The invention claimed is:

1. A dual clutch mechanism for an automotive transmission, the dual clutch mechanism comprising:
   an input shaft adapted for rotation about a longitudinally extending axis;
   a first clutch arrangement coaxial with the axis of the input shaft, the first clutch arrangement having a first clutch driven plate and a first clutch driving plate;
   a second clutch arrangement coaxial with the axis of the input shaft and spaced from the first clutch mechanism, the second clutch arrangement having a second clutch driven plate and a second clutch driving plate;
   a clutch hub coaxial with the axis of the input shaft and at least partially surrounding a portion of the input shaft, the clutch hub being operably connected to the first and second clutch driven plates to drive the driven plates for rotation;
   a hollow outer output shaft operably connected to the first clutch driving plate for rotation therewith, the hollow outer output shaft being coaxial with the axis of the input shaft and spaced a lateral distance from the input shaft;
   an inner output shaft positioned within the outer output shaft and adapted for rotation independent thereof, the inner output shaft operably connected to the second clutch driving plate for rotation therewith, and the inner output shaft being coaxial with the axis of the input shaft and spaced a lateral distance from the input shaft; and
   at least one of a clutch feed support and an oil distribution sleeve positioned between the clutch hub and the input shaft and having a plurality of fluid passages for feeding oil to the first and second clutch arrangements.

2. A dual clutch mechanism for an automotive transmission in accordance with claim 1, wherein the clutch hub is axially separated from the inner and outer output shafts.

3. A dual clutch mechanism for an automotive transmission in accordance with claim 2, wherein the first and second clutch mechanisms each comprise a plurality of clutch plates, each of the first and second clutch mechanisms having a driven set of clutch plates operably connected to the clutch driven plate and a driving set of clutch plates operably connected to the clutch driving plate, each of the driven and driving set of clutch plates disposed in an intermeshing mechanism.

4. A dual clutch mechanism for an automotive transmission in accordance with claim 3, wherein the first and second clutch mechanisms each comprise a pressure apply chamber and a balance chamber, the pressure apply chamber and the pressure balance chamber being separated at least in part by an apply piston, the apply piston having an apply position where the piston is arranged to frictionally engage the driven set of clutch plates operably connected to the clutch driven plate and the driving set of clutch plates operably connected to the clutch driving plate to drive the clutch driving plate in rotation with the clutch driven plate when sufficient pressure is applied in the pressure apply chamber and an unapplied position where the piston is not arranged to frictionally engage the driven set of clutch plates operably connected to the clutch driven plate and the driving set of clutch plates operably connected to the clutch driving plate so the clutch driving plate is not in rotation with the clutch driven plate.

5. A dual clutch mechanism for an automotive transmission in accordance with claim 4, wherein a biasing device is disposed in at least one of the pressure balance chambers to bias the apply piston away from the apply position and to the unapplied position.

6. A dual clutch mechanism for an automotive transmission in accordance with claim 5, wherein a clutch feed support is positioned between the clutch hub and the input shaft, the clutch feed support having a plurality of fluid passages for feeding oil to the first and second clutch arrangements, and an oil distribution sleeve is positioned between the clutch feed support and the input shaft, the oil distribution sleeve having fluid passages aligned with the fluid passages of the clutch feed support for feeding oil to the clutch feed support fluid passages.

7. A dual clutch mechanism for an automotive transmission accordance with claim 5, wherein the oil distribution sleeve and clutch feed support are rotatably independent relative to the clutch hub.

8. A dual clutch mechanism for an automotive transmission in accordance with claim 7, wherein the fluid passages of the oil distribution sleeve and clutch feed support include a fluid passage for supplying fluid to the pressure apply chamber of the first clutch mechanism, a fluid passage for supplying fluid to the pressure apply chamber of the second clutch mechanism, a fluid passage for supplying fluid to the pressure balance chamber of the first clutch mechanism and a fluid passage for supplying fluid to the pressure balance chamber of the second clutch mechanism.

9. A dual clutch mechanism for an automotive transmission in accordance with claim 7, wherein the pressure balance chambers of the first and second clutch mechanisms each include a balance chamber housing opposite the apply piston, the pressure apply chambers of the first and second clutch mechanisms each include a pressure chamber housing opposite the apply piston, and a cooling fluid passage is positioned between each of the balance chamber housings and the clutch hub for supplying cooling fluid to the clutch plates.

10. A dual clutch mechanism for an automotive transmission in accordance with claim 8, wherein the fluid passages for supplying fluid to the pressure balance chamber of the first and second clutch mechanisms also supply fluid to the respective cooling fluid passage being positioned between each of the balance chamber housings and the clutch hub for supplying cooling fluid to the clutch plates.

11. A dual clutch mechanism for an automotive transmission in accordance with claim 1, wherein an outer housing is disposed around the first and second clutch mechanisms, the outer housing being rotatably independent relative to the input and output shafts and having a sealing member disposed between the input shaft and the outer housing to allow for relative rotation between the input shaft and the outer housing while minimizing the amount of fluid that can pass between the sealing member and the input shaft.

12. A dual clutch mechanism for an automotive transmission in accordance with claim 11, wherein an inner housing is disposed between the outer housing and the first and second clutch mechanisms, the inner housing being operably connected to and driven for rotation by the input shaft, and the inner housing driving means for supplying fluid to the dual clutch mechanism.

13. A dual clutch mechanism for an automotive transmission in accordance with claim 12, wherein an intermediate housing is disposed between the outer housing and the inner housing, the intermediate housing being rotatably independent relative to the input and output shafts, and the intermediate housing defining a portion of a fluid supply path for supplying fluid to each of the first and second clutch mechanisms.

14. A dual clutch mechanism for an automotive transmission in accordance with claim 13, wherein the fluid supply path supplies fluid to the plurality of fluid supply passages, including a fluid passage for supplying fluid to the pressure apply chamber of the first clutch mechanism, a fluid passage for supplying fluid to the pressure apply chamber of the second clutch mechanism, a fluid passage for supplying fluid to the pressure balance chamber of the first clutch mechanism and a fluid passage for supplying fluid to the pressure balance chamber of the second clutch mechanism.

15. A dual clutch mechanism comprising:
an input shaft, a first output shaft and a second output shaft, the input shaft being axially spaced from the first and second output shafts;
a first clutch mechanism substantially overlying the input shaft and having a first clutch driven side and a first clutch driving side, the first clutch driven side being rotatably drivable by the input shaft and the first output shaft being selectively rotatably drivable by the first clutch driving side; and
a second clutch mechanism substantially overlying the input shaft and having a second clutch driven plate and a second clutch driving plate, the second clutch driven side being rotatably drivable by the input shaft and the second output shaft being selectively rotatably drivable by the second clutch driving side.

16. The dual clutch mechanism of claim 15, wherein the mechanism comprises a parallel dual clutch mechanism where the first and second clutch mechanisms are axially spaced from each other.

17. The dual clutch mechanism of claim 15, wherein the mechanism comprises a radial dual clutch mechanism where the first and second clutch mechanisms are radially spaced from each other.

18. The dual clutch mechanism of claim 15, wherein the first and second clutch mechanisms are each selectively activated by an apply piston, each of the apply pistons at least partially separating a pressure apply chamber from a pressure balance chamber containing a biasing mechanism biasing the piston to an unapplied position, the piston being shiftable to an apply position to activate the respective clutch mechanism when the pressure in the pressure apply chamber is larger than the pressure in the pressure balance chamber and the biasing force provided by the biasing mechanism.

19. The dual clutch mechanism of claim 17, wherein the first and second output shafts are concentrically arranged relative to each other.

20. A dual clutch mechanism comprising:
an input shaft, a first output shaft and a second output shaft;
a clutch hub operatively connected to the input shaft such that the clutch hub is able to be driven by the input shaft, the clutch hub being axially separated from the first and second output shafts;
a first clutch mechanism substantially overlying the input shaft and having a first clutch driven side and a first clutch driving side, the first clutch driven side able to be driven by the clutch hub, and the first output shaft able to be selectively driven by the first clutch driving side; and
a second clutch mechanism substantially overlying the input shaft and having a second clutch driven plate and a second clutch driving plate, the second clutch driven side able to be driven by the clutch hub, and the second output shaft able to be selectively driven by the second clutch driving side.

21. A dual clutch mechanism for an automotive transmission, the dual clutch mechanism comprising:
an input shaft adapted for rotation about a longitudinally extending axis;
a first clutch arrangement coaxial with the axis of the input shaft, the first clutch arrangement having a first clutch driven plate and a first clutch driving plate;
a second clutch arrangement coaxial with the axis of the input shaft and spaced from the first clutch mechanism, the second clutch arrangement having a second clutch driven plate and a second clutch driving plate;
a clutch hub coaxial with the axis of the input shaft and at least partially surrounding a portion of the input shaft, the clutch hub being operably connected to the first and second clutch driven plates to drive the driven plates for rotation, the clutch hub being axially separated from the inner and outer output shafts;
a hollow outer output shaft operably connected to the first clutch driving plate for rotation therewith, the hollow outer output shaft being coaxial with the axis of the input shaft and spaced a lateral distance from the input shaft;
an inner output shaft positioned within the outer output shaft and adapted for rotation independent thereof, the inner output shaft operably connected to the second clutch driving plate for rotation therewith, and the inner output shaft being coaxial with the axis of the input shaft and spaced a lateral distance from the input shaft;
the first and second clutch mechanisms each comprise a plurality of clutch plates, each of the first and second clutch mechanisms having a driven set of clutch plates operably connected to the clutch driven plate and a driving set of clutch plates operably connected to the clutch driving plate, each of the driven and driving set of clutch plates disposed in an intermeshing mechanism;
the first and second clutch mechanisms each comprise a pressure apply chamber and a balance chamber, the pressure apply chamber and the pressure balance chamber being separated at least in part by an apply piston, the apply piston having an apply position where the piston is arranged to frictionally engage the driven set of clutch plates operably connected to the clutch driven plate and the driving set of clutch plates operably connected to the clutch driving plate to drive the clutch driving plate in rotation with the clutch driven plate when sufficient pressure is applied in the pressure apply chamber and an unapplied position where the piston is not arranged to frictionally engage the driven set of clutch plates operably connected to the clutch driven plate and the driving set of clutch plates operably connected to the clutch driving plate so the clutch driving plate is not in rotation with the clutch driven plate;
a biasing device disposed in at least one of the pressure balance chambers to bias the apply piston away from the apply position and to the unapplied position; and
a clutch feed support positioned between the clutch hub and the input shaft, the clutch feed support having a plurality of fluid passages for feeding oil to the first and second clutch arrangements, and an oil distribution sleeve is positioned between the clutch feed support and the input shaft, the oil distribution sleeve having fluid passages aligned with the fluid passages of the clutch feed support for feeding oil to the clutch feed support fluid passages.

22. A dual clutch mechanism for an automotive transmission, the dual clutch mechanism comprising:
   an input shaft adapted for rotation about a longitudinally extending axis;
   a first clutch arrangement coaxial with the axis of the input shaft, the first clutch arrangement having a first clutch driven plate and a first clutch driving plate;
   a second clutch arrangement coaxial with the axis of the input shaft and spaced from the first clutch mechanism, the second clutch arrangement having a second clutch driven plate and a second clutch driving plate;
   a clutch hub coaxial with the axis of the input shaft and at least partially surrounding a portion of the input shaft, the clutch hub being operably connected to the first and second clutch driven plates to drive the driven plates for rotation;
   a hollow outer output shaft operably connected to the first clutch driving plate for rotation therewith, the hollow outer output shaft being coaxial with the axis of the input shaft and spaced a lateral distance from the input shaft;
   an inner output shaft positioned within the outer output shaft and adapted for rotation independent thereof, the inner output shaft operably connected to the second clutch driving plate for rotation therewith, and the inner output shaft being coaxial with the axis of the input shaft and spaced a lateral distance from the input shaft; and
   an outer housing disposed around the first and second clutch mechanisms, the outer housing being rotatably independent relative to the input and output shafts and having a sealing member disposed between the input shaft and the outer housing to allow for relative rotation between the input shaft and the outer housing while minimizing the amount of fluid that can pass between the sealing member and the input shaft.

23. A dual clutch mechanism for an automotive transmission in accordance with claim 22, wherein an inner housing is disposed between the outer housing and the first and second clutch mechanisms, the inner housing being operably connected to and driven for rotation by the input shaft, and the inner housing driving means for supplying fluid to the dual clutch mechanism.

24. A dual clutch mechanism for an automotive transmission in accordance with claim 23, wherein an intermediate housing is disposed between the outer housing and the inner housing, the intermediate housing being rotatably independent relative to the input and output shafts, and the intermediate housing defining a portion of a fluid supply path for supplying fluid to each of the first and second clutch mechanisms.

25. A dual clutch mechanism for an automotive transmission in accordance with claim 24, wherein the fluid supply path supplies fluid to the plurality of fluid supply passages, including a fluid passage for supplying fluid to the pressure apply chamber of the first clutch mechanism, a fluid passage for supplying fluid to the pressure apply chamber of the second clutch mechanism, a fluid passage for supplying fluid to the pressure balance chamber of the first clutch mechanism and a fluid passage for supplying fluid to the pressure balance chamber of the second clutch mechanism.

* * * * *